United States Patent [19]

McKee et al.

[11] Patent Number: 5,889,111
[45] Date of Patent: Mar. 30, 1999

[54] ELASTOMERIC GRAFT POLYMERES

[75] Inventors: Graham Edmund McKee, Neustadt; Ekkehard Jahns, Weinheim; Wolfgang Fischer, Ludwigshafen; Norbert Güntherberg, Speyer; Bernhard Rosenau, Neustadt, all of Germany

[73] Assignee: BASF Aktiengesellschaft, Ludwigshafen, Germany

[21] Appl. No.: 849,363

[22] PCT Filed: Nov. 29, 1995

[86] PCT No.: PCT/EP95/04688

§ 371 Date: Jun. 5, 1997

§ 102(e) Date: Jun. 5, 1997

[87] PCT Pub. No.: WO96/17878

PCT Pub. Date: Jun. 13, 1996

[30] Foreign Application Priority Data

Dec. 9, 1994 [DE] Germany .......................... 44 43 886.9

[51] Int. Cl.⁶ ...................................................... C08L 51/00
[52] U.S. Cl. .............................. 525/64; 525/66; 525/67; 525/69; 525/70; 525/71; 525/77; 525/80; 525/85; 525/86; 525/307; 525/309
[58] Field of Search ................................ 525/85, 86, 307, 525/309, 80, 64, 67, 69, 71, 77, 70, 66

[56] References Cited

U.S. PATENT DOCUMENTS

| 4,012,462 | 3/1977 | Chaudhary ............... 525/243 |
| 4,668,737 | 5/1987 | Eichenauer et al. ....... 525/73 |
| 5,344,877 | 9/1994 | Fischer et al. ............ 525/83 |
| 5,438,099 | 8/1995 | Fischer et al. ............ 525/67 |

FOREIGN PATENT DOCUMENTS

| 164 048 | 12/1985 | European Pat. Off. . |
| 381 358 | 8/1990 | European Pat. Off. . |
| 570 773 | 11/1993 | European Pat. Off. . |
| 76 14415 | 5/1976 | France . |
| 42 42 485 | 6/1994 | Germany . |

*Primary Examiner*—Mark L. Warzel
*Attorney, Agent, or Firm*—Keil & Weinkauf

[57] ABSTRACT

Particulate elastomeric graft polymers which are suitable for improving the quality of macromolecular base materials B consist of a) a grafting core comprising an elastomeric polymer $P_K$, the particles having a mean particle diameter of from 1 to 150 μm, and b) one or more shells, the outer shell $S_a$ consisting of a polymer $P_a$ which is compatible or partly compatible with the base material B.

13 Claims, No Drawings

ELASTOMERIC GRAFT POLYMERES

The present invention relates to particulate graft polymers which are suitable for improving the quality of macromolecular base materials B and consist of a) a grafting core comprising an elastomeric polymer, the core having a mean particle diameter of from 1 to 100 μm, and b) one or more shells, the outer shell $S_a$ consisting of a polymer $P_a$ which is compatible or partly compatible with the base material B.

The present invention furthermore relates to the preparation of these graft polymers, their use for improving the quality of macromolecular base material B and mixtures of these graft polymers and the base materials and moldings produced therefrom.

It is generally known that the impact strength of nonresilient polymers can be improved by adding elastomeric polymers. In such blends, the nonresilient base material, which is also referred to as the matrix, forms a continuum in which the elastomeric particles are incorporated in the form of discrete particles.

Since the elastomeric polymer is often not compatible with the base polymer and is therefore difficult to incorporate in the base polymer, the rubber is surrounded in its preparation, in a manner also generally known, with a graft shell whose composition corresponds to that of the base polymer or which is compatible with the base polymer. This further improves the processing properties and performance characteristics of the toughened blend.

As a rule, the elastomeric graft polymers are prepared by emulsion polymerization. This process gives very finely divided polymers having a mean particle diameter of from 0.1 to less than 1 μm.

However, this material gives only molding materials having high surface gloss. Frequently, however, dull moldings are desirable, so that dulling agents, such as silica gel or chalk, must be concomitantly used, although they have an adverse effect on the mechanical properties of the molding materials and of the moldings.

EP-A 269 324 discloses graft polymers having a relatively large particle diameter and comprising an elastomeric core polymer and an outer graft shell of a polymer which is compatible with the abovementioned nonresilient base material. Although molding materials containing these refracting particles have a dull surface, the process for the preparation of the particles is extremely inconvenient. In this process, the polymer particles of the grafting core which have initially formed in the emulsion polymerization are swollen with freshly added monomer, after which the polymerization is continued. This process can be repeated until the desired particle size is reached. Finally, these particles are provided with the graft shell which makes them compatible for mixing with the matrix polymer.

Furthermore, the preparation of the elastomeric particles by the emulsion polymerization process has in general the disadvantage that some of the emulsifiers required for this purpose remain in the polymer and are exuded from the moldings produced therefrom, with formation of undesirable coatings.

It is an object of the present invention to remedy the deficiencies described. It is a particular object of the present invention to provide elastomeric particulate graft polymers which make it possible to increase the impact strength of nonresilient polymers and at the same time perform the function of dulling agents.

We have found that these objects are achieved by the elastomeric particulate graft polymers defined at the outset.

We have also found a process for the preparation of these graft polymers, their use as components for blends with macromolecular base materials, such blends themselves and moldings comprising such blends.

The novel graft polymers are preferably obtained as follows: the liquid monomer or liquid monomer mixture $M_K$ which is to be polymerized to give the core polymer $P_K$ is mixed with water and a protective colloid. The polymerization initiator is added either now or only after dispersing of the monomer or after heating of the dispersion. A dispersion of very small monomer droplets in water is prepared from the heterogeneous mixture by thorough stirring at high speed, intensive mixers of any design being suitable for this purpose. The desired particle size within the defined range can be determined, for example, by preparing optical micrographs and counting the number of particles which have a certain diameter.

The polymerization is initiated by heating the dispersion. The reaction, which is now carried out with moderate stirring during which the droplets are no longer further dispersed, is continued until the conversion is more than 50%, preferably more than 85%, based on $M_K$.

Once the polymerization of the grafting core is complete, the reaction is continued in a manner known per se with the monomers $M_s$ from which the corresponding shells S, consisting of the polymer $P_s$, are formed. However, the grafting may also be started as early as when the polymerization conversion of the monomer $M_K$ is still incomplete and is more than 50%, preferably more than 85%. In this case, the shell and core form a more fluid transition compared with the sharper boundary of the core-and-shell polymer in the case of the initially complete conversion of the core monomers.

If the graft polymer has only a single shell, which is generally sufficient, this consists of the material $P_a$. In some cases, chiefly when the grafting cores are relatively small and when it is desired to introduce a larger amount of the core polymer $P_K$ into the particles, multishell graft polymers having the structure $P_K$-$P_a$-$P_K$-$P_a$ are preferred, and the inner shells may also consist of other polymers $P_x$ in order thus to modify and hence improve the properties of the graft polymers.

Dispersing of the monomers $M_K$ is carried out as a rule at from 0° to 100° C., preferably at room temperature, and as a rule from 0.5 to 10 kg of water are used per kilogram of the monomers.

The protective colloids suitable for stabilizing the dispersion are water-soluble polymers which coat the monomer droplets and the polymer particles formed therefrom and thus protect them from coagulation.

Suitable protective colloids are cellulose derivatives, such as carboxymethylcellulose and hydroxymethylcellulose, poly-N-vinylpyrrolidone, polyvinyl alcohol and polyethylene oxide, anionic polymers such as polyacrylic acid, and cationic ones, such as poly-N-vinylimidazole. The amount of these protective colloids is preferably from 0.1 to 5% by weight, based on the total weight of the monomers $M_K$. Low molecular weight surface-active compounds, for example those of the type comprising the anionic and cationic soaps, are as a rule unsuitable for the preparation of the novel graft polymers since they lead to polymer particles having smaller diameters, as obtained in the emulsion polymerization.

Suitable polymerization initiators are free radical formers, in particular those which have marked solubility in the monomers and which preferably have a half-life of 10 hours when the temperature is from 25° to 150° C. (ten-hour half-life at from 25° to 150° C.). For example, peroxides, such as lauroyl peroxide, peroxosulfates, tert-butyl perpivalate and azo compounds, such as azobisbutyronitrile, are suitable. It is possible to use different initiators for the preparation of the grafting core and of the graft shells. The amount of the initiators is in general from 0.1 to 2.5% by weight, based on the amount of the monomers.

The reaction mixture furthermore preferably contains buffer substances, such as $Na_2HPO_4/NaH_2PO_4$ or sodium citrate/citric acid, in order to establish a pH which remains essentially constant. As a rule, molecular weight regulators, such as ethylhexyl thioglycolate or tert-dodecyl mercaptan, are also added during the polymerization, in particular of the shell-forming monomers Ms.

The temperature for the polymerization of the monomers $M_K$ to give the core consisting of $P_K$ is as a rule from 25° to 150° C., preferably from 50° to 120° C. Grafting of the shells onto the core is generally carried out at from 25 ° to 150° C., preferably from 50° to 120° C. The lower limits of these ranges correspond to the decomposition temperatures of the polymerization initiators used in each case.

Suitable elastomeric polymers $P_K$ of the grafting core material are chiefly those which are composed of from 50 to 100% by weight, of $C_2$–$C_{36}$-alkyl acrylates, preferably n-butyl acrylate and/or 2-ethylhexyl acrylate. In addition to these soft monomers, hard monomers, such as methyl acrylate, the $C_1$–$C_{12}$-alkyl methacrylates, styrene and α-methylstyrene, acrylonitrile and methacrylonitrile, are also suitable, in amounts of up to 50% by weight.

Such polymers are obtained with from about 0.1 to 10% by weight of bifunctional or polyfunctional comonomers, eg. butadiene and isoprene, divinyl esters of dicarboxylic acids, such as those of succinic acid and adipic acid, diallyl and divinyl ethers of bifunctional alcohols, such as those of ethylene glycol and of butane-1,4-diol, diesters of acrylic acid and methacrylic acid with the stated bifunctional alcohols, 1,4-divinylbenzene and triallyl cyanurate. The acrylates of tricyclodecenyl alcohol (dihydrodicyclopentadienyl acrylate) of the formula I

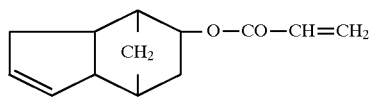

and the allyl esters of acrylic acid and of methacrylic acid are particularly preferred.

In the novel graft polymers, the weight ratio of the sum of all shells to the core is from about 0.05:1 to 2.5:1. The mean diameter of the particles is from about 1 to about 150 μm, preferably from 2 to 50 μm, particularly preferably from 5 to 30 μm. The mean diameter corresponds to the $D_{50}$ value, where 50% by weight of all particles have a smaller diameter, and 50% by weight a larger diameter, than the diameter which corresponds to the $D_{50}$ value. In order to characterize the particle size distribution, in particular its width, the $D_{10}$ value and the $D_{90}$ value are often stated in addition to the $D_{50}$ value. 10% by weight of all particles are smaller, and 90% by weight larger, than the $D_{10}$ diameter. Similarly, 90% by weight of all particles have a smaller diameter, and 10% by weight a larger diameter, than that which corresponds to the $D_{90}$ value.

The novel particulate graft polymers are used mainly as additives for brittle thermoplastic macromolecular base materials B. On the one hand, their impact strength is improved as a result; on the other hand, molding materials having reduced surface gloss and accordingly dull moldings are obtained owing to diffuse reflection (scattering) of the light by the large particles.

The elastomeric particles are incorporated into the melt of B so that the resulting molding material is composed of the thermoplastic matrix B and the graft polymer particles dispersed therein. In order to make the elastomeric core polymers $P_K$ compatible with the base polymer for the stated purposes, as a rule their outer graft shell Sa consists of the same material as the base polymer or a very similar material to said polymer. The technically most important base polymers are homopolymers of styrene, of methyl acrylate, of $C_1$–$C_4$-alkyl methacrylates and of acrylonitrile, copolymers of these monomers and further comonomers, such as methacrylonitrile, ie. these monomers and monomer mixtures are suitable for the synthesis of the outer graft shell $S_a$, depending on the composition of the base polymer B.

If the outer shell is to be, for example, relatively hard, intermediate shells of a softer material may be preferable. Furthermore, a shell comprising a soft material, for example the core material, may follow the first hard graft shell, thus frequently making it possible further to improve the properties of the thermoplastic molding materials prepared from B and the graft polymer particles and of the moldings produced therefrom. The relationships between the nature of the two components in the molding materials and the material properties furthermore correspond to those known for the base material and graft polymers which are prepared by emulsion polymerization.

This also applies to base materials other than the stated ones, for example polyesters, polyamides, polyvinyl chloride, polycarbonates and polyoxymethylene. In these cases, compatible and partly compatible graft shells $S_a$ can readily be determined by a few preliminary experiments.

Compatibility is understood as meaning miscibility at the molecular level. A polymer is considered to be compatible with another one if, in the solid state, the molecules of the two polymers are randomly distributed, ie. if the concentration of one polymer along any vector neither increases nor decreases. Conversely, a polymer is considered to be incompatible if, in the solid state, two phases which are separated from one another by a sharp phase boundary are formed. Along a vector intersecting the phase boundary, the concentration of one polymer increases abruptly from zero to 100% and that of the other polymer decreases from 100% to zero.

Between the two extremes, there are fluid transitions. Although they have a phase boundary, it is ill defined. Mutual partial penetration of the two phases occurs at the boundary. Accordingly, the concentration of one polymer increases more or less rapidly from zero to 100% along a vector intersecting the phase boundary and that of the other polymer decreases more or less rapidly from 100% to zero.

Partial compatibility, as frequently encountered in technically important polymers, is the term also used to describe this latter case.

Examples of partly compatible polymers are the pairs polymethyl methacrylate/copolymer of styrene and acrylonitrile, polymethyl methacrylate/polyvinyl chloride and polyvinyl chloride/copolymer of styrene and acrylonitrile and the three-phase system polycarbonate/polybutadiene/copolymer of styrene and acrylonitrile (=polycarbonate/ABS).

Further information on the definition of compatibility of polymers and in particular the solubility parameter as a quantitative measure is given, for example, in Polymer Handbook, Editors J. Brandrup and E. H. Immergut, 3rd edition, Wiley, New York 1989, pages VII/519–VII/550.

The novel graft polymers are used as a rule in amounts of from 1 to 60, preferably from 2 to 45, % by weight, based on the amount of their blend with the base polymer, for toughening. Moldings comprising such blends are highly light-scattering and therefore particularly dull to opaque.

If a dulling effect is desired in combination with high transparency, concentrations of from 2 to 10% by weight of the graft polymers are preferred. Since these low concentrations result in only a relatively small increase in the impact strength, conventional, very finely divided elastomeric modifiers may be concomitantly used in this case, in the conventional amounts minus the amount of novel graft polymer used as a dulling agent.

Opaque polymers which already contain impact modifiers, for example polybutadiene-modified styrene/acrylonitrile copolymer (=ABS), polyalkyl acrylate-modified styrene/acrylonitrile copolymer (=ASA) or styrene/acrylonitrile copolymer (=AES) modified with ethylene/propylene/diene monomer (EPDM) can also be dulled by the concomitant use of the novel graft polymers.

The novel particles achieve a dulling effect without having a marked adverse effect on mechanical properties, as is to be observed in the case of conventional dulling agents, such as chalk or silica gel.

Owing to their higher molecular weight and greater bulk of the molecules, the protective colloids used in the preparation of the core polymers have far less tendency than the low molecular weight emulsifiers to migrate to the surface of the plastic. High molecular weight protective colloids therefore have far less tendency to exude from a molding.

In addition, the molding materials modified with the novel particles and the moldings produced therefrom have the advantages of improved printability and antiblocking properties, ie. those surfaces of the moldings which are roughened by the particles do not adhere to one another. This effect due to adhesion is known, for example, for plastics films. Films containing novel particles and stacked one on top of the other can be readily separated from one another, in contrast to films which do not contain such particles.

The molding materials may furthermore contain additives of all types. Examples are lubricants and mold release agents, pigments, flameproofing agents, dyes, stabilizers, fibrous and pulverulent fillers and reinforcing agents and antistatic agents, each of which are added in the conventional amounts.

The novel molding materials can be prepared by mixing methods known per se, for example by incorporating the particulate graft polymer into the base material at above the melting point of the base material, in particular at from 150° to 350° C., in a conventional mixing apparatus. Moldings having reduced surface gloss (dullness) and high impact strength can be produced from the novel molding materials. No separation of the polymer components occurs in the molding.

EXAMPLES

Example 1

Particulate graft polymer of n-butyl acrylate (core) and styrene/acrylonitrile (shell); according to the invention, polymer A

| | |
|---|---|
| 1230 g | of water, |
| 8.6 g | Na$_2$HPO$_4$.12 H$_2$O  ⎫ as a buffer system |
| 3.2 g | NaH$_2$PO$_4$.12 H$_2$O  ⎭ |
| 1.6 g | of dilauroyl peroxide as an initiator |
| 100 g | of polyvinyl alcohol solution (10% by weight in water, degree of hydrolysis 88%, average molecular weight about 127,000) as protective colloid |
| 600 g | of n-butyl acrylate as a core monomer and |

-continued

| | |
|---|---|
| 9.0 g | of dihydrodicyclopentadienylacrylate as a crosslinking agent | were combined in the stated order under nitrogen and stirred for 40 minutes with a high-speed stirrer (dissolver stirrer, 3500 rpm, 5 cm toothed disk). At the same time, the mixture was gradually heated to 73° C. This resulted in the formation of monomer droplets having a mean diameter of 10 μm, as determined microscopically on a sample.

This dispersion was transferred to another kettle and heated there to 87° C. in the course of 2 hours with moderate stirring, the core polymer (conversion about 95%) being formed.

The mixture was then mixed with a mixture of

| | |
|---|---|
| 280 g | of styrene   ⎫ as shell monomers |
| 120 g | of acrylohitrile ⎭ |
| 0.5 g | of tert-butyl perpivalate as initiator and |
| 0.5 g | of 2-ethylhexyl thioglycolate as a molecular weight regulator | at 70° C. in the course of 10 minutes with moderate stirring, and the resulting mixture was then kept at 70° C. for 2 hours and then heated to 85° C. in the course of 2 hours.

The particles of the graft polymer thus obtained (60% by weight of n-butyl acrylate, 28% by weight of styrene and 12% by weight of acrylonitrile, crosslinked) had a mean particle diameter $D_{50}$ of 10 μm, a diameter $D_{10}$ of 4 μm and a diameter $D_{90}$ of 25 μm.

The suspension obtained was incorporated as such into the polymer, as described below.

Example 2

Moldings A base material B was thoroughly mixed in the usual manner in an extruder (ZSK 30, Werner and Pfleiderer) at 260° C. with the polymers E1 and E2 prepared by conventional emulsion polymerization, and the mixture was melted. The polymer A was introduced into this polymer melt continuously in the form of its emulsion, and the water content of the emulsion was removed by means of dewatering apparatuses along the extruder, after which the melt was extruded. The product obtained after cooling and granulation was injection molded on an injection molding machine at a melt temperature of 220° C. and a mold temperature of 60° C. to give circular disks having a diameter of 6 cm and a thickness of 0.2 cm of standard small bars (cf. DIN 53453), the properties of which were tested.

The polymers were the following materials (% by weight in each case):

Polymer A: elastomeric graft polymers according to Example 1

Polymer B: hard thermoplastic copolymer comprising 65% of styrene +35% of acrylonitrile, viscosity number according to DIN 53 726: 80 ml/g (0.5% strength in dimethylformamide at 23° C.).

Emulsion polymer E1: elastomeric graft polymer prepared in a conventional manner by emulsion polymerization. Comprising 60% of n-butyl acrylate, crosslinked with tricyclodecenyl acrylate (core)/30% of styrene +10% of acrylonitrile (shell), mean particle diameter $D_{50}$ about 0.5 μm Emulsion polymer E2: elastomeric graft polymer prepared in a conventional manner by emulsion polymerization. Comprising 60% of butadiene (core)/28% of styrene +12% of acrylonitrile (shell), mean particle diameter $D_{50}$ about 0.35 μm.

The ratios in the polymer blends and the properties of the moldings produced from them are shown in the table below.

| Experi-ment No. | Compostion of the polymer blend [% by weight] | | | | Notched impact strength[1] [kJ/m²] | Light reflec-tion[2] [%] |
|---|---|---|---|---|---|---|
| | B | A | E1 | E2 | | |
| 1* | 50 | — | 50 | — | 20.0 | 87 |
| 2* | 50 | — | — | 50 | 18.0 | 85 |
| 3  | 50 | 5 | 45 | — | 19.6 | 12 |
| 4  | 45 | 5 | — | 45 | 18.5 | 10 |

[1]measured according to DIN 53 453 at 23° C. on standard small bars with milled notch
[2]measured according to DIN 67530 with a Gonio GPZ photometer from Carl Zeiss, at an angle of 45° C. (reflection)
*for comparison It can be seen that those molding materials which contain exclusively conventional graft polymer as the impact modifier have high light reflection (Experiment No. 1* and 2*). In contrast, molding materials in which 10% of the conventional graft polymer E 1 or E 2 is replaced by the novel graft polymer particles A having a large diameter exhibit considerably lower reflection in combination with a similar notched impact strength (Experiments No. 3 and 4).

We claim:

1. A particulate elastomeric graft polymer which increases the impact strength of and at the same time performs the function of a dulling agent for macromolecular base materials B comprising B-1) polymers containing polymerized sytrene, methyl acrylate, $C_1$–$C_4$-alkyl methacrylate, acrylonitrile or methacrylonitrile or mixtures thereof, or
   B-2) impact-resistant styrene copolymers of ASA, ABS or AES or mixtures thereof, or
   B-3) polyesters, polyamides, polyvinyl chloride, polycarbonates or polyoxymethylene or mixtures thereof,
or mixtures thereof
   and consists of a core K and one or more shells S, in which
      the particles of the particulate elastomeric graft copolymer have a mean particle diameter of from 1 to 150 μm,
      the core K consists of a crosslinked elastomeric polymer $P_K$,
      the outer shell $S_a$ is formed by a polymer $P_a$ which is compatible or partly compatible with the base material B and
      any further shells present may be composed of $P_K$, $P_a$ or further polymers $P_x$,
   obtained by
   a) dispersing the liquid monomer or liquid monomer mixture $M_K$ corresponding to the polymer $P_K$ in water using a protective colloid to give a dispersion of droplets having a mean diameter of from 1 to 100 μm,
   b) polymerizing the droplets by means of a polymerization initiator to a conversion of more than 50%, based on the amount of $M_K$, and
   c) subjecting the mixture obtained in stage b) to graft polymerization with sequential addition of the monomers or monomer mixtures $M_S$ corresponding to the graft shells S until the outer shell $S_a$ has been produced using the corresponding monomers $M_a$.

2. A graft polymer as claimed in claim 1, in which the core polymer $P_K$ is composed of
   from 50 to 100% by weight of a $C_2$–$C_{12}$-alkyl acrylate,
   from 0 to 10% by weight of a crosslinking monomer, and
   from 0 to 50% by weight of one or more further monomers, based in each case on the amount of $P_K$.

3. A graft polymer as claimed in claim 1, in which the polymer $P_a$ of the outer shell contains polymerized styrene, methyl acrylate, $C_1$–$C_4$-alkyl methacrylate, acrylonitrile or methacrylonitrile or mixtures thereof.

4. A graft polymer as claimed in claim 1, in which the weight ratio of the sum of all shells to the core is from 0.05:1 to 2.5:1.

5. A process for the preparation of a particulate graft polymer which is suitable for improving the quality of macromolecular base materials B, by polymerization of a core K comprising monomers $M_K$ which form elastomeric polymers $P_K$ and grafting with one or more shells S, the outer shell $S_a$ being composed of a polymer $P_a$ which is formed from the monomers $M_a$ and is compatible or partly compatible with the base material B, by polymerization in the aqueous phase in the presence of a free radical polymerization initiator, wherein
   the monomer or a monomer mixture $M_K$ is very finely dispersed in water using a protective colloid,
   the monomers $M_K$ are polymerized to a conversion of more than 50% and
   this mixture containing the grafting cores K is subjected to graft polymerization by sequential addition of the monomers or monomer mixtures $M_s$ corresponding to the graft shells S until the outer shell $S_a$ has been produced using the corresponding monomers $M_a$
   whereby the mean particle size of the particulate graft polymer produced is 1 to 150 μm.

6. A molding material comprising a macromolecular base material B containing a graft polymer as claimed in claim 1.

7. A molding comprising a molding material as claimed in claim 6.

8. A method for improving the mechanical properties of macromolecular base materials B, wherein the graft polymers of claim 1 are incorporated into the base materials B.

9. A method for matting the surface of macromolecular base materials B, wherein the graft polymers of claim 1 are incorporated into the base material B.

10. The particulate graft polymer of claim 1 wherein the particles of the particulate elastomeric graft copolymer have a particle size of from 2 to 50 μm.

11. The particulate graft polymer of claim 10 wherein the particles of the particulate elastomeric graft copolymer have a particle size of from 5 to 30 μm.

12. The process for the preparation of a particular graft polymer of claim 5 wherein the mean particle size of the particulate graft polymer produced is 2 to 50 μm.

13. The process for the preparation of a particular graft polymer of claim 12 wherein the mean particle size of the particulate graft polymer produced is 5 to 30 μm.

* * * * *